United States Patent
Yim

(10) Patent No.: US 10,096,435 B2
(45) Date of Patent: Oct. 9, 2018

(54) DIGITALIZED DOUBLE-EXCITATION UNINTERRUPTED SWITCHING POWER SUPPLY

(71) Applicant: Jageson Electronic Technology (ShenZhen) Co.Ltd., Shenzhen (CN)

(72) Inventor: Mau Shin Frank Yim, Hongkong (HK)

(*) Notice: Subject to any disclaimer, the term of this patent is extended or adjusted under 35 U.S.C. 154(b) by 0 days.

(21) Appl. No.: 15/607,480

(22) Filed: May 27, 2017

(65) Prior Publication Data

US 2017/0317524 A1    Nov. 2, 2017

Related U.S. Application Data

(63) Continuation of application No. PCT/CN2016/070833, filed on Jan. 13, 2016.

(30) Foreign Application Priority Data

Jan. 19, 2015  (CN) .......................... 2015 1 0025116

(51) Int. Cl.
   *H01H 9/22*    (2006.01)
(52) U.S. Cl.
   CPC ..................... *H01H 9/22* (2013.01)
(58) Field of Classification Search
   CPC .... H01H 9/22; H02M 3/335; H02M 3/33584; H02M 3/33592; H02M 3/3376;
   (Continued)

(56) References Cited

U.S. PATENT DOCUMENTS

2006/0077700 A1* 4/2006 Lin ................... H02M 7/53871
                                                     363/98
2010/0020581 A1* 1/2010 Mazzola ........... H02M 3/33569
                                                     363/132
(Continued)

FOREIGN PATENT DOCUMENTS

CN       201536275 U       7/2010
CN       201742151 U       2/2011
(Continued)

*Primary Examiner* — Yemane Mehari
(74) *Attorney, Agent, or Firm* — Wayne & King LLC

(57) ABSTRACT

A digitalized double-excitation uninterrupted switching power supply comprises a main transformer provided with a primary coil and a secondary coil, a main loop, a synchronous rectification output loop, a synchronous direct-current converter and a digital control unit, wherein the main loop comprises a high-voltage switching network, a resonant inductor, the primary coil and a resonant capacitor. The synchronous rectification output loop comprises a current-doubler rectifier formed by connecting two synchronous rectifier tubes in series oppositely and the secondary coil in parallel, and a filter circuit connected to two output ends of the current-doubler rectifier. The synchronous direct-current converter comprises two low-voltage switching tubes, an isolator and a low-voltage direct-current source. The digital control unit selects the main loop or the synchronous direct-current converting circuit automatically to work according to the voltage change of a high-voltage direct-current bus, and provides stable DC output.

7 Claims, 1 Drawing Sheet

(58) Field of Classification Search
CPC .............. H02M 7/217; H02M 7/5387; Y02B 70/1433; Y02B 70/1475
USPC ............................ 363/17, 21.02, 127, 132
See application file for complete search history.

(56) References Cited

U.S. PATENT DOCUMENTS

2011/0031927 A1* 2/2011 Kajouke ................ H02J 7/022
 320/108
2012/0113700 A1* 5/2012 Kajouke .............. B60L 11/005
 363/127

FOREIGN PATENT DOCUMENTS

| CN | 104682546 A | 6/2015 |
| CN | 204441998 U | 7/2015 |
| JP | H08242579 A | 9/1996 |

* cited by examiner

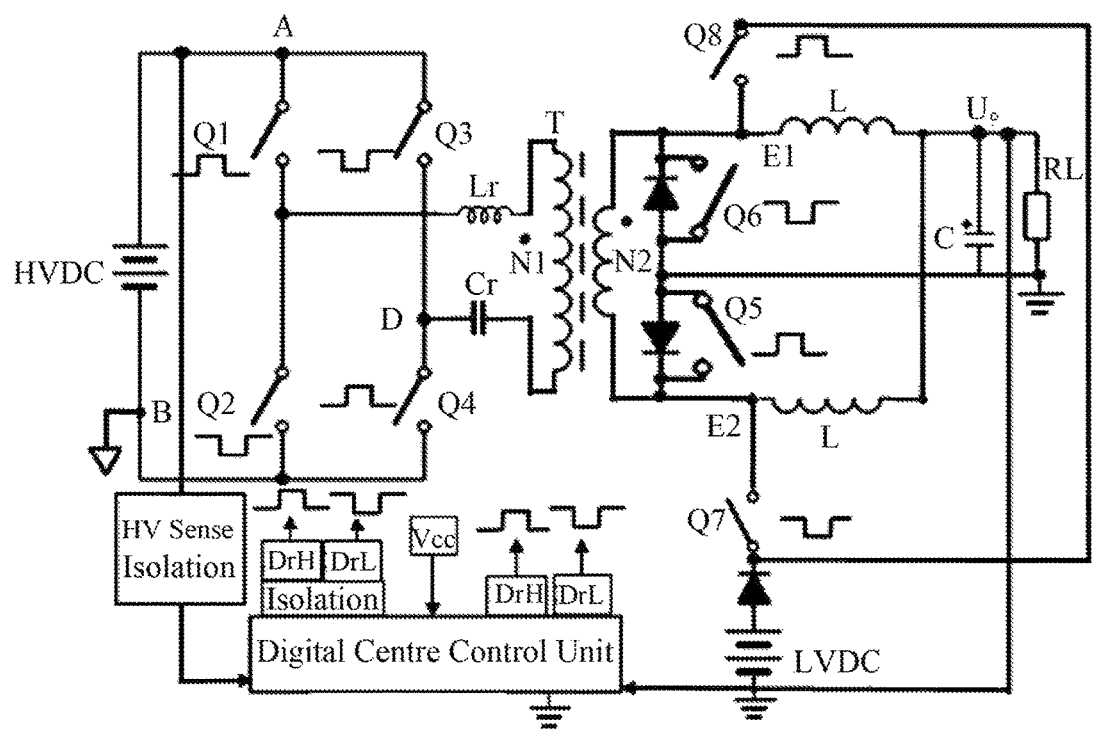

DIGITALIZED DOUBLE-EXCITATION UNINTERRUPTED SWITCHING POWER SUPPLY

CROSS-REFERENCE TO RELATED APPLICATIONS

This application is a continuation of International Patent Application No. PCT/CN2016/070833 with a filing date of Jan. 13, 2016, designating the United States, now pending, and further claims priority to Chinese Patent Application No. 201510025116.5 with a filing date of Jan. 19, 2015. The content of the aforementioned application, including any intervening amendments thereto, are incorporated herein by reference.

TECHNICAL FIELD

The present invention relates to a voltage converting device, in particular to a digitalized double-excitation uninterrupted switching power supply.

BACKGROUND OF THE PRESENT INVENTION

In the main trend of energy conservation and emission reduction, the efficiency of a voltage converting device is also continuously improved. Many line topologies are emerging. In an application field represented by an IT industry, market demands for power-off parts are very large, and currently, are still occupied by a traditional "atypical tandem" power-off protection device (UPS and charger). Users and the markets turn a blind eye to the fact that the function utilization rate of "atypical tandem" UPS is lower than the probability of AC power off, and do not know the huge waste caused actually. A typical application form is IDC room which frequently has UPS redundant power supply protection systems with hundreds of KVA, construction cost ranging from millions of RMB to tens of millions of RMB, and waste of millions of kilowatt hours of electric energy per year.

Currently, digital equipment, such as computers, security monitoring systems, etc. also needs to select a double-input voltage converting device generally so as to maintain uninterrupted operation of equipment and prevent data loss caused by power failure.

SUMMARY OF PRESENT INVENTION

For avoiding the above-mentioned defects in the prior art, the present invention provides a digitalized double-excitation uninterrupted switching power supply to meet the demands of digital equipment and appliances for matching with uninterrupted power supplies.

The present invention is realized by the following specific solution. A digitalized double-excitation uninterrupted switching power supply comprises:

a main transformer, provided with a primary coil and a secondary coil;

a main loop, comprising a high-voltage switching network connected between a high-voltage direct-current bus and a high-voltage ground, and a resonant inductor, the primary coil and a resonant capacitor connected from a first end to a second end of the high-voltage switching network in sequence;

a synchronous rectification output loop, comprising a current-doubler rectifier formed by connecting two synchronous rectifier tubes in series oppositely and the secondary coil in parallel, and a filter circuit connected to a first output end and a second output end (E1 and E2) of the current-doubler rectifier;

a synchronous direct-current converting circuit, comprising a low-voltage switching tube, an isolator and a low-voltage direct-current power supply connected between the first output end (E1) and the low-voltage ground in sequence; and another low-voltage switching tube connected between the second output end (E2) and a negative electrode of the isolator; and a digital center control unit, providing two groups of synchronous drive pulses, wherein the first group of drive pulses DrH' and DrL' controls the high-voltage switching network, and the second group of drive pulses DrH and DrL controls the two synchronous rectifier tubes and the two low-voltage switching tubes; a first sampling input end of the digital center control unit is connected with an output end of the synchronous rectification output loop, a second sampling input end of the digital center control unit is connected with an isolated sampling unit which is used for sampling the voltage of the high-voltage direct-current bus and automatically selecting the main loop to work according to the voltage change.

The drive pulses DrH' and DrL' are preferably pulse signals formed by drive pulses DrH and DrL in the second group of drive pulses through an isolating circuit respectively.

The direct current on the high-voltage direct-current bus is obtained by an AC rectifier filter. When the voltage between the high-voltage direct-current bus and the high-voltage ground is rated voltage, the main loop provides electric energy for loads by the synchronous rectification output loop; when the voltage between the high-voltage direct-current bus and the high-voltage ground is 95%-85% of the rated voltage, the main loop provides electric energy for the loads alternatively; and when the voltage between the high-voltage direct-current bus and the high-voltage ground is lower than 85% of the rated voltage, the main loop provides all electric energy for the loads.

The filter circuit comprises two filter inductors and a filter capacitor. The two filter inductors are respectively connected with a first output end and a second output end (E1 and E2) of a current-doubler rectifier circuit. The other ends of the two filter inductors are respectively connected to the upper end of the filter capacitor as a DC output end. The other end of the filter capacitor is connected with the low-voltage ground of a common end of the two synchronous rectifier tubes.

In the above-mentioned digital double-excitation uninterrupted switching power supply, a capacitor is also included, is bridged between the high-voltage direct-current bus and the high-voltage ground, and is used for preventing transient abrupt change when in conversion between the main loop and the synchronous direct-current converting circuit. In another solution, the high-voltage switching network adopts a full-bridge switching network formed by four high-voltage switching tubes which are connected in a manner of two-two serial connection and then are connected in parallel. The first end and the second end of the high-voltage switching network are two central points of the full bridge respectively.

In another solution, the high-voltage switching network adopts a half-bridge switching network formed by serial connection of two high-voltage switching tubes. The first end of the high-voltage switching network is the central point of a half bridge, and the second end of the high-voltage switching network is a connecting end for the half-bridge switching network and the high-voltage ground.

In a third solution, the high-voltages itching network adopts a push-pull switching network composed of two high-voltage switching tubes.

Under the premise of no influence on the working efficiency of the AC-DC power supply, the digitalized double-excitation uninterrupted switching power supply realizes hot standby of second energy (low-voltage direct-current source), and can supplement energy as long as the AC voltage or high-voltage DC is lower than a certain value, so that the stable output of the power supply can be effectively guaranteed. The power supply can realize connection of the second energy and the interrupted function only by fewer elements, is small in volume and low in cost and can be widely applied in digital equipment such as computers, security monitoring systems, etc.

DESCRIPTION OF THE DRAWINGS

FIG. 1 is a schematic diagram of an embodiment of a digitalized double-excitation uninterrupted switching power supply of the present invention.

DETAILED DESCRIPTION OF PREFERRED EMBODIMENTS

The present invention will be further described in combination with the drawings and the embodiments.

Referring to FIG. 1, the digitalized double-excitation uninterrupted switching power supply of the embodiment comprises a main transformer, a main loop, a synchronous direct-current converting circuit, a synchronous rectification output loop, a digital center control unit and an isolated sampling unit, etc.

The main transformer T comprises a primary coil N1 and a secondary coil N2.

The main loop comprises a high-voltage switching network connected between the high-voltage direct-current bus and the high-voltage ground. The high-voltage switching network is a full-bridge switching network formed by four high-voltage switching tubes Q1, Q2, Q3 and Q4 which are connected in a manner of two-two serial connection and then are connected in parallel. The line with point A represents connection with the high-voltage direct-current bus, point B is connected with the high-voltage ground, and point C and point D represent two center points of the full bridge. The main loop also comprises a resonant inductor Lr connected between the point C and the point D in series, the primary coil N1 of the main transformer and a resonant capacitor Cr.

The synchronous rectification output loop comprises a current-doubler rectifier, and a filter circuit connected with the first output end and the second output end (E1 and E2) of the current-doubler rectifier. The current-doubler rectifier comprises two synchronous rectifier tubes Q5 and Q6, and the secondary coil N2. The two synchronous rectifier tubes Q5 and Q6 are connected in series oppositely and then are connected with the secondary coil N2 in parallel. The common end of the two synchronous rectifier tubes Q5 and Q6 is connected with the low-voltage ground. A node connecting the synchronous rectifier tube Q6 and the secondary coil N2 is the first output end E1, a node connecting the synchronous rectifier tube Q5 and the secondary coil N2 is the second output end E2, and Q5 and Q6 are respectively connected with a protecting diode in parallel.

The filter circuit comprises two filter inductors L1 and L2 and a filter capacitor C. The two filter inductors L1 and L2 are respectively connected with the first output end E1 and the second output end E2 of the current-doubler rectifier circuit. The other ends of the two filter inductors are respectively connected to the upper end of the filter capacitor C as a DC (direct current) output end Uo. The other end of the filter capacitor C is connected with the low-voltage ground. RL is a load resistor.

The synchronous direct-current converting circuit comprises a low-voltage direct-current power supply LVDC, an isolator, a low-voltage switching tube Q7 and a low-voltage switching tube Q8. The low-voltage switching tube Q8, the isolator and the low-voltage direct-current power supply LVDC are successively connected between the first output end E1 and the low-voltage ground in series. The low-voltage switching tube Q7, the isolator and the low-voltage direct-current power supply LVDC are successively connected between the second output end E2 and the low-voltage ground in series.

The digital center control unit comprises a programmable driving modulation signal generator, a clock generator, circuits for internal time-sequence control, etc. A first sampling input end of the control unit is connected with the output end of the synchronous rectification output loop. The digital center, control, unit provides two groups of synchronous drive pulses by internal calculation and time-sequence processing according to sampling signals for output voltage V0. One group of drive pulses DrH and DrL directly controls the two synchronous rectifier tubes Q6 and Q6 as well as the two low-voltage switching tubes Q8 and Q7. The other group of drive pulses DrH' and DrL' is used for driving upper-arm high-voltage switching tubes Q1 and Q4 and lower-arm high-voltage switching tubes Q2 and Q3 of the main loop. An isolated sampling unit can be connected between a second sampling input end of the digital center control unit and the high-voltage direct-current bus (point A), and is used for sampling the voltage of the high-voltage direct-current bus and selecting the main loop or the synchronous direct-current converting circuit automatically to work according to a voltage sampling value. The digital center control unit provides working energy by power supply voltage Vcc. The drive pulses DrH' and DrL are pulse signals formed by drive pulses DrH and DrL in the second group of drive pulses through an isolating transformer (isolating unit) respectively The four high-voltage switching tubes Q1, Q2, Q3 and Q4, the low-voltage switching tubes Q7 and Q8, and two synchronous rectifier tubes Q5 and Q6 adopt MOSFET switching tubes or IGBT switching tubes respectively.

HVDC in FIG. 1 represents a high-voltage direct-current source obtained after the AC voltage is processed by traditional processing of rectification and filtering and the like. For the electric energy provided for the load by the main loop, or by the synchronous direct-current converting circuit or by both of the main loop and the synchronous direct-current converting circuit, when the drive pulse DrH' acts on one group of high-voltage switching tubes Q1 and Q4 in the full-bridge switching network, the low-voltage switching tubes Q8 and the synchronous, rectifier tube Q5 are also synchronously conducted with Q1 and Q4 under the control of the drive pulse DrH; when the above-mentioned drive pulse DrL' acts on another group of high-voltage switching tubes Q2 and Q3 in the full-bridge switching network, the low-voltage switching tube Q7 and the synchronous rectifier tube Q6 are also synchronously conducted with Q2 and Q3 under the control of the drive pulse DrL; and when one group of high-voltage switching tubes Q1 and Q4 is conducted, another group of high-voltage switching tubes Q2 and Q3 is cut off, and vice versa.

When the voltage between the high-voltage direct-current bus (point A) and the high-voltage ground (point B) is the rated voltage and one group of high-voltage switching tubes Q1 and Q2 is conducted, the voltage is coupled to the secondary coil N2 from the primary coil N1 of the main transformer T, is rectified by one synchronous rectifier tube Q5 and is outputted to the load RL by the filter inductor L2 and the filter capacitor C; in the process, the low-voltage switching tube Q8 of the synchronous direct-current converting circuit is also conducted, but since the voltage of the output end (point E1) of the current-doubler rectifier is not lower than that of the low-voltage direct-current source LVDC, the low-voltage direct source can not provide electric energy for the load. Similarly, when another group of high-voltage switching tubes Q2 and Q3 is conducted, the voltage is coupled to the secondary coil N2 from the primary coil N1 of the main transformer T, is rectified by another synchronous rectifier tube Q6 and is outputted to the load RL by the filter inductor L2 and the filter capacitor C; in the process, the low-voltage switching tube Q7 of the synchronous direct-current converting circuit is also conducted, but since the voltage of the output end (point E2) of the current-doubler rectifier is not lower than that of the low-voltage direct-current source LVDC, the low-voltage direct source can not provide electric energy for the load. Therefore, when the voltage between the high-voltage direct-current bus and the high-voltage ground is normal, the electric energy is provided for the load by the main loop through the synchronous rectification output loop.

When the voltage between the high-voltage direct-current bus (point A) and the high-voltage ground (point B) is 95%-85% of the rated voltage, the primary coil N1 is coupled to the secondary coil N2, and is rectified by one synchronous rectifier tube. Since the voltage of the output end E1 or E2 of the current-doubler rectifier is lower than that of the low-voltage direct-current source LVDC, the low-voltage switching tube Q8 or Q7 of the synchronous direct-current converting circuit is conducted, and the main loop and the synchronous direct-current converting circuit commonly provide electric energy for the load.

When the voltage between the high-voltage direct-current bus (point A) and the high-voltage ground (point B) is lower than 85% of the rated voltage (including power failure), the main loop stops working, and all the electric energy is provided for the loads from the synchronous direct-current converting circuit by the synchronous rectification output loop.

The switching power supply in the above-mentioned embodiment also comprises a functional circuit for preventing transient abrupt change when in conversion between the main energy and assistant energy. The functional circuit is a capacitor which is bridged between the high-voltage direct-current bus and the high-voltage ground. Due to the energy storage function of the capacitor, no transient abrupt change is caused during conversion of the two paths of energy, and no overshooting or interference is caused. The functional circuit also can be formed by a plurality of capacitors which are connected in series and in parallel.

I claim:

1. A digitalized double-excitation uninterrupted switching power supply, comprising:
    a main transformer, provided with a primary coil and a secondary coil;
    a main loop, comprising a high-voltage switching network connected between a high-voltage direct-current bus and a high-voltage ground, and a resonant inductor, the primary coil and a resonant capacitor connected from a first end to a second end of the high-voltage switching network in sequence;
    a synchronous rectification output loop, comprising a current-doubler rectifier formed by connecting two synchronous rectifier tubes in series oppositely and the secondary coil in parallel, and a filter circuit connected to a first output end and a second output end (E1 and E2) of the current-doubler rectifier;
    a synchronous direct-current converting circuit, comprising a low-voltage switching tube, an isolator and a low-voltage direct-current power supply connected between the first output end (E1) and the low-voltage ground in sequence; and another low-voltage switching tube connected between the second output, end (E2) and a negative electrode of the isolator; and
    a digital center control unit, providing two groups of synchronous drive pulses, wherein the first group of drive pulses DrH' and DrL' controls the high-voltage switching network, and the second group of drive pulses DrH and DrL controls the two synchronous rectifier tubes and the two low-voltage switching tubes; a first sampling input end of the digital center control unit is connected with an output end of the synchronous rectification output loop, a second sampling input end of the digital center control unit is connected with an isolated sampling unit which is used, for sampling the voltage of the high-voltage direct-current bus and automatically selecting the main loop to work according to the voltage change;
    wherein when the voltage between the high-voltage direct-current bus and the high-voltage ground is rated voltage, the main loop provides electric energy for loads by the synchronous rectification output loop;
    when the voltage between the high-voltage direct-current bus and the high-voltage ground is 95%-85% of the rated voltage, the main loop provides electric energy for the loads alternatively; and
    when the voltage between the high-voltage direct-current bus and the high-voltage ground is lower than 85% of the rated voltage the main loop provides all electric energy for the loads.

2. The switching power supply of claim 1, wherein the drive pulses DrH' and DrL' are pulse signals formed by drive pulses DrH and DrL in the second group through an isolating circuit respectively.

3. The switching power supply of claim 1, wherein the filter circuit comprises two filter inductors and a filter capacitor; the two filter inductors are respectively connected with a first output end and a second output end (E1 and E2) of a current-doubler rectifier circuit; the other ends of the two filter inductors are respectively connected to the upper end of the filter capacitor as a DC output end; and the other end of the filter capacitor is connected with the low-voltage ground of a common end of the two synchronous rectifier tubes.

4. The switching power supply of claim 1, wherein the high-voltage switching network is a full-bridge switching network formed by four high-voltage switching tubes which are connected in a manner of two-two serial connection and then are connected in parallel; and the first end and the second end of the high-voltage switching network are two central points of the full bridge respectively.

5. The switching power supply of claim 4, wherein the four high-voltage switching tubes, the two low-voltage switching tubes and the two synchronous rectifier tubes adopt MOSFET switches or IGBT switches respectively.

6. The switching power supply of claim 1 wherein the high-voltage switching network is a half-bridge switching network or a push-pull switching network.

7. The switching power supply of claim 1, wherein a capacitor is bridged between the high-voltage direct-current bus and the high-voltage ground and is used for preventing transient abrupt change when in conversion between the main loop and the synchronous direct-current converting circuit.

* * * * *